(12) United States Patent
Su et al.

(10) Patent No.: US 10,164,537 B2
(45) Date of Patent: Dec. 25, 2018

(54) SWITCHING REGULATOR

(71) Applicant: National Taipei University of Technology, Taipei (TW)

(72) Inventors: Ting-Wen Su, Taipei (TW); Yuh-Shyan Hwang, Taipei (TW)

(73) Assignee: National Taipei University of Technology, Taipei (TW)

( * ) Notice: Subject to any disclaimer, the term of this patent is extended or adjusted under 35 U.S.C. 154(b) by 30 days.

(21) Appl. No.: 15/397,441

(22) Filed: Jan. 3, 2017

(65) Prior Publication Data

US 2018/0191249 A1 Jul. 5, 2018

(51) Int. Cl.
*H02M 1/08* (2006.01)
*H02M 3/158* (2006.01)
*H02M 1/00* (2006.01)

(52) U.S. Cl.
CPC ............ *H02M 3/1588* (2013.01); *H02M 1/08* (2013.01); *H02M 2001/0025* (2013.01); *H02M 2001/0048* (2013.01); *H02M 2001/0054* (2013.01); *H02M 2001/0058* (2013.01); *Y02B 70/1491* (2013.01)

(58) Field of Classification Search
CPC ............ H02M 3/00; H02M 3/02; H02M 3/04; H02M 3/10; H02M 3/145; H02M 3/155; H02M 3/156; H02M 3/1563; H02M 3/157; H02M 3/158; H02M 3/1588; H02M 1/08; H02M 1/083; H02M 2001/0009; H02M 2001/0012; H02M 2001/0025; H02M 2001/0032; H02M 2001/0048; H02M 2001/0054; H02M 2001/0058; Y02B 70/14; Y02B 70/1466; Y02B 70/1491; Y02B 70/16

See application file for complete search history.

(56) References Cited

U.S. PATENT DOCUMENTS

| | | | | |
|---|---|---|---|---|
| 2004/0227498 | A1* | 11/2004 | Okada | G05F 1/575 323/285 |
| 2006/0113980 | A1* | 6/2006 | Yoshida | H02M 3/1588 323/282 |
| 2008/0290854 | A1* | 11/2008 | Uchiike | H02M 3/1588 323/284 |
| 2011/0148377 | A1* | 6/2011 | Schiff | H02M 3/1588 323/283 |
| 2012/0146599 | A1* | 6/2012 | Oyama | H02M 3/1588 323/271 |
| 2013/0308061 | A1* | 11/2013 | Murakami | H02M 3/1582 348/730 |

(Continued)

Primary Examiner — Timothy J Dole
Assistant Examiner — Ivan Laboy Andino
(74) Attorney, Agent, or Firm — DLA Piper LLP (US)

(57) ABSTRACT

A switching regulator includes a first switch; a second switch coupled between the first switch and ground; an inductor coupled to a common node between the first and second switches; a capacitor coupled between the inductor and ground; a controller receiving a disable signal, and generating first and second control signals respectively for the first and second switches; and a crossing detector comparing an auxiliary voltage at the common node with a negative reference voltage to generate a comparison signal, and generating the disable signal based on the first control signal and the comparison signal. The second control signal switches into an inactive state upon the disable signal indicating a reference-crossing of the auxiliary voltage.

9 Claims, 4 Drawing Sheets

(56) References Cited

U.S. PATENT DOCUMENTS

| | | | | |
|---|---|---|---|---|
| 2014/0021933 A1* | 1/2014 | Gladish | ............... | H02M 1/08 |
| | | | | 323/311 |
| 2014/0146238 A1* | 5/2014 | Murakami | .......... | H02M 3/1563 |
| | | | | 348/730 |
| 2014/0160601 A1* | 6/2014 | Ouyang | ............... | H02M 3/158 |
| | | | | 361/18 |
| 2014/0191744 A1* | 7/2014 | Choi | ................. | H02M 3/156 |
| | | | | 323/283 |
| 2015/0084605 A1* | 3/2015 | Ho | ................. | G01R 19/175 |
| | | | | 323/235 |
| 2015/0084613 A1* | 3/2015 | Ho | ................. | H02M 3/1588 |
| | | | | 323/299 |
| 2015/0091536 A1* | 4/2015 | Tanaka | ............... | H02M 3/156 |
| | | | | 323/235 |
| 2015/0137778 A1* | 5/2015 | Miyazaki | ............. | H02M 3/156 |
| | | | | 323/271 |
| 2015/0155778 A1* | 6/2015 | Kurokawa | ........... | H02M 3/156 |
| | | | | 323/235 |
| 2015/0318785 A1* | 11/2015 | Svorc | ................. | H02M 3/158 |
| | | | | 323/235 |
| 2016/0028311 A1* | 1/2016 | Murakami | .......... | H02M 3/1588 |
| | | | | 323/271 |
| 2016/0172979 A1* | 6/2016 | Xue | ................. | H02M 1/083 |
| | | | | 323/235 |
| 2018/0019671 A1* | 1/2018 | Li | ................. | H02M 1/083 |

* cited by examiner

SWITCHING REGULATOR

FIELD

The disclosure relates to switching regulation, and more particularly to a switching regulator.

BACKGROUND

A synchronous type switching regulator may use a zero-crossing detector to assist in reducing energy loss from a capacitor thereof. In order to significantly reduce the energy loss, the zero-crossing detector conventionally requires a comparator that operates relatively fast. However, faster operation speed of the comparator leads to more energy consumption, which is adverse in maximizing efficiency of the synchronous type switching regulator.

SUMMARY

Therefore, an object of the disclosure is to provide a switching regulator that can alleviate the drawback of the prior art.

According to the disclosure, the switching regulator includes a first switch, a second switch, an inductor, a capacitor, a controller and a crossing detector. The first switch has a first terminal that is used to receive an input voltage, a second terminal, and a control terminal that receives a first control signal. The second switch has a first terminal that is coupled to the second terminal of the first switch, a second terminal that is grounded, and a control terminal that receives a second control signal. The inductor has a first terminal that is coupled to the second terminal of the first switch, and a second terminal that is used to provide an output voltage. The capacitor is coupled between the second terminal of the inductor and ground. The controller is coupled to the control terminals of the first and second switches, receives a disable signal, and generates the first and second control signals respectively for the first and second switches. The crossing detector includes a comparing module and an output generating module. The comparing module is coupled to the second terminal of the first switch for receiving an auxiliary voltage thereat, further receives a reference voltage that is negative, and compares the auxiliary voltage with the reference voltage to generate a comparison signal. The output generating module is coupled to the controller and the comparing module for receiving the first control signal and the comparison signal respectively therefrom, and generates, for the controller and based on the first control signal and the comparison signal, the disable signal that is capable of indicating a reference-crossing of the auxiliary voltage at which the auxiliary voltage equals the reference voltage. Each of the first and second control signals switches between an active state that causes the respective one of the first and second switches to conduct, and an inactive state that causes the respective one of the first and second switches to not conduct. The second control signal switches into the inactive state upon the disable signal indicating the reference-crossing of the auxiliary voltage.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
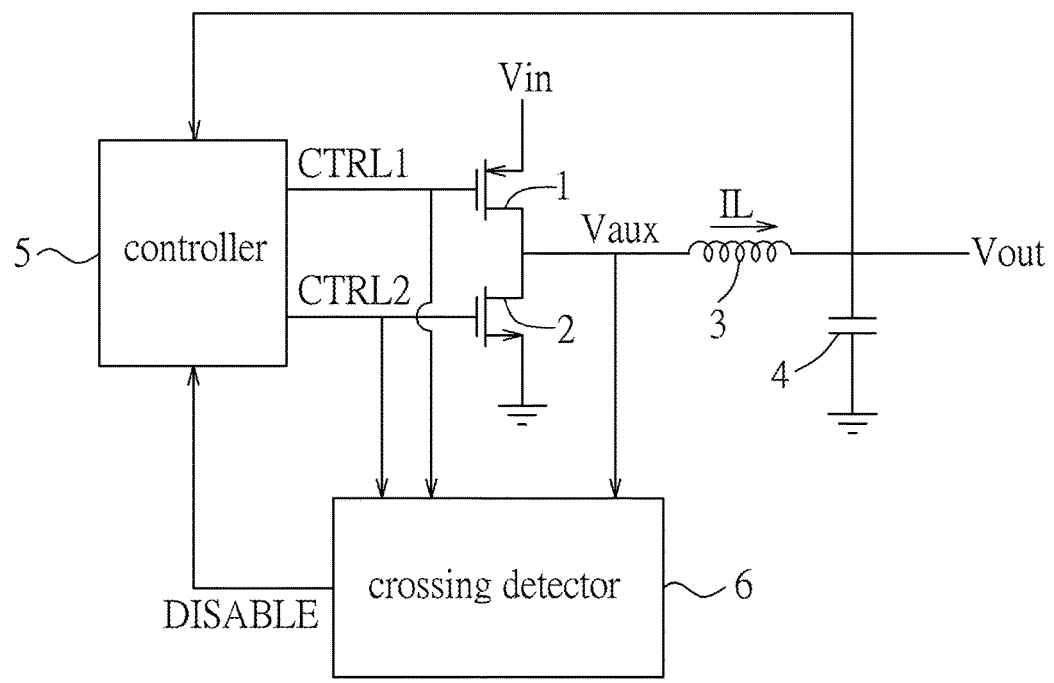
FIG. 1 is a circuit block diagram illustrating a first embodiment of a switching regulator according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a switching regulator according to the disclosure is used to generate a direct current (DC) output voltage (Vout) based on a DC input voltage (Vin), and includes a first switch 1, a second switch 2, a first inductor 3, a first capacitor 4, a controller 5 and a crossing detector 6.

The first switch 1 has a first terminal that is used to receive the input voltage (Vin), a second terminal, and a control terminal that receives a first control signal (CTRL1). In this embodiment, the first switch 1 is a P-type metal oxide semiconductor field effect transistor (pMOSFET) having a source terminal, a drain terminal and a gate terminal that respectively serve as the first, second and control terminals of the first switch 1.

The second switch 2 has a first terminal that is coupled to the second terminal of the first switch 1, a second terminal that is grounded, and a control terminal that receives a second control signal (CTRL2). In this embodiment, the second switch 2 is an N-type metal oxide semiconductor field effect transistor (nMOSFET) having a drain terminal, a source terminal and a gate terminal that respectively serve as the first, second and control terminals of the second switch 2.

The first inductor 3 has a first terminal that is coupled to the second terminal of the first switch 1, and a second terminal that is used to provide the output voltage (Vout).

The first capacitor 4 is coupled between the second terminal of the first inductor 3 and ground.

The controller 5 is coupled to the second terminal of the first inductor 3 for receiving the output voltage (Vout) therefrom, is coupled further to the control terminals of the first and second switches 1, 2, and further receives a disable signal (DISABLE). The controller 5 generates, based on the output voltage (Vout) and the disable signal (DISABLE), the first and second control signals (CTRL1, CTRL2) respectively for the first and second switches 1, 2.

Figure 3:
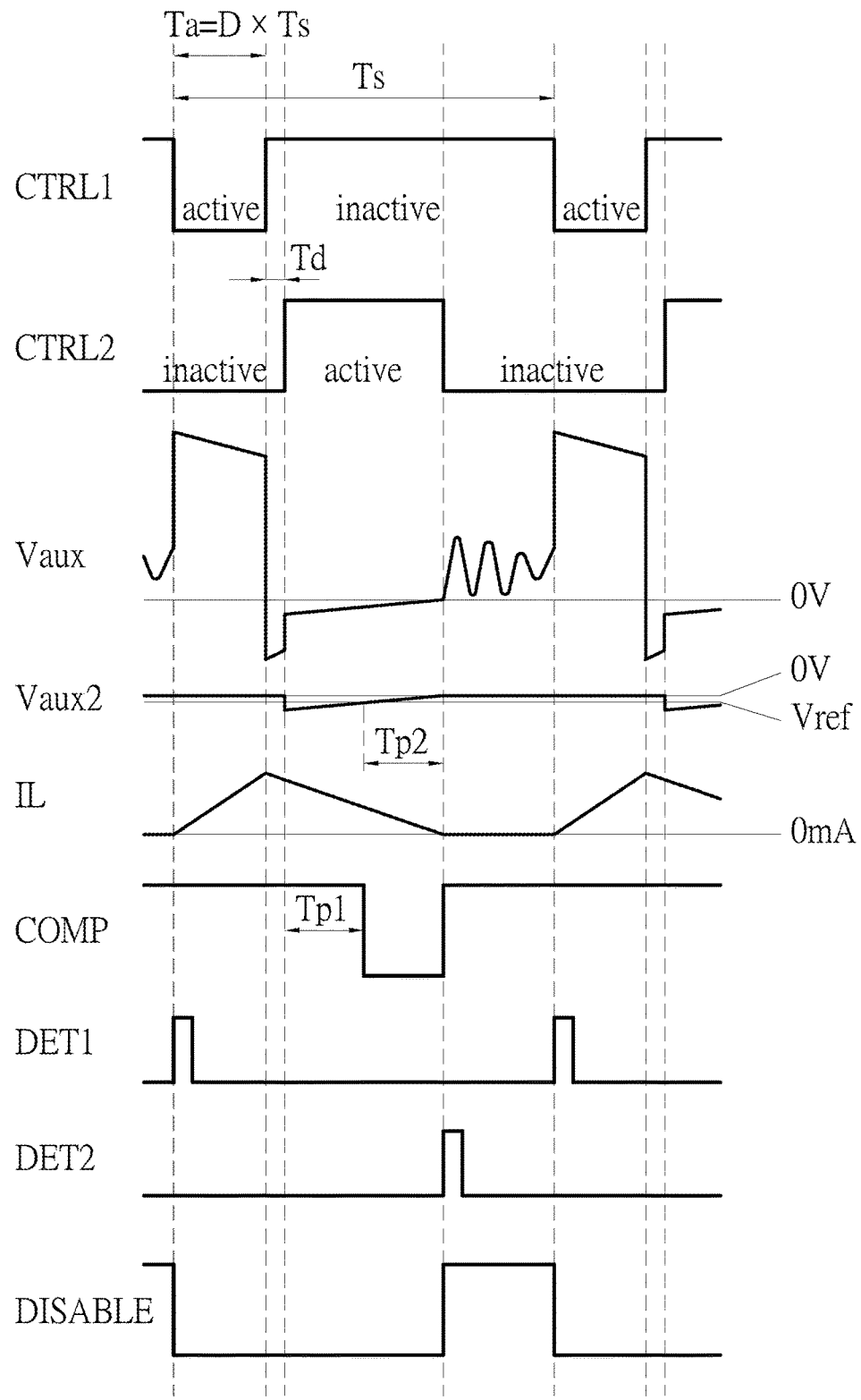
FIG. 3 is a timing diagram illustrating operation of the first embodiment.

Further referring to FIG. 3, the first control signal (CTRL1) switches between an active state (e.g., a logic low level) that causes the first switch 1 to conduct and an inactive state (e.g., a logic high level) that causes the first switch 1 to not conduct, and has a duty cycle of D that is associated with the output voltage (Vout). The second control signal (CTRL2) switches between an active state (e.g., a logic high level) that causes the second switch 2 to conduct and an inactive state (e.g., a logic low level) that causes the second switch 2 to not conduct, and switching thereof into the inactive state is associated with the disable signal (DISABLE).

In this embodiment, as shown in FIG. 3, the first and second control signals (CTRL1, CTRL2) have the same switching period of Ts. When one of the first and second control signals (CTRL1, CTRL2) is in the active state, the other one of the first and second control signals (CTRL1, CTRL2) is in the inactive state. The second control signal (CTRL2) switches into the active state at an end of a predetermined dead time interval of Td counting from each instance of the first control signal (CTRL1) switching into the inactive state.

In this embodiment, the controller 5 increases the duty cycle of D when the output voltage (Vout) is lower than a predetermined target voltage, and decreases the duty cycle of D when the output voltage (Vout) is higher than the predetermined target voltage, so as to stabilize the output voltage (Vout) at the predetermined target voltage.

In one example, the controller 5 may use pulse width modulation (PWM) techniques to change the duty cycle of D. When the output voltage (Vout) is lower than the predetermined target voltage, the switching period of Ts is unchanged, and an active time interval (equaling Ta) of the first control signal (CTRL1) is increased, such that the duty cycle of D=Ta/Ts is increased. When the output voltage (Vout) is higher than the predetermined target voltage, the switching period of Ts is unchanged, and the active time interval (equaling Ta) of the first control signal (CTRL1) is decreased, such that the duty cycle of D=Ta/Ts is decreased.

In another example, the controller 5 may use pulse frequency modulation (PFM) techniques to change the duty cycle of D. When the output voltage (Vout) is lower than the predetermined target voltage, the active time interval (equaling Ta) of the first control signal (CTRL1) is unchanged, and the switching period of Ts is decreased, such that the duty cycle of D=Ta/Ts is increased. When the output voltage (Vout) is higher than the predetermined target voltage, the active time interval (equaling Ta) of the first control signal (CTRL1) is unchanged, and the switching period of Ts is increased, such that the duty cycle of D=Ta/Ts is decreased.

Figure 2:
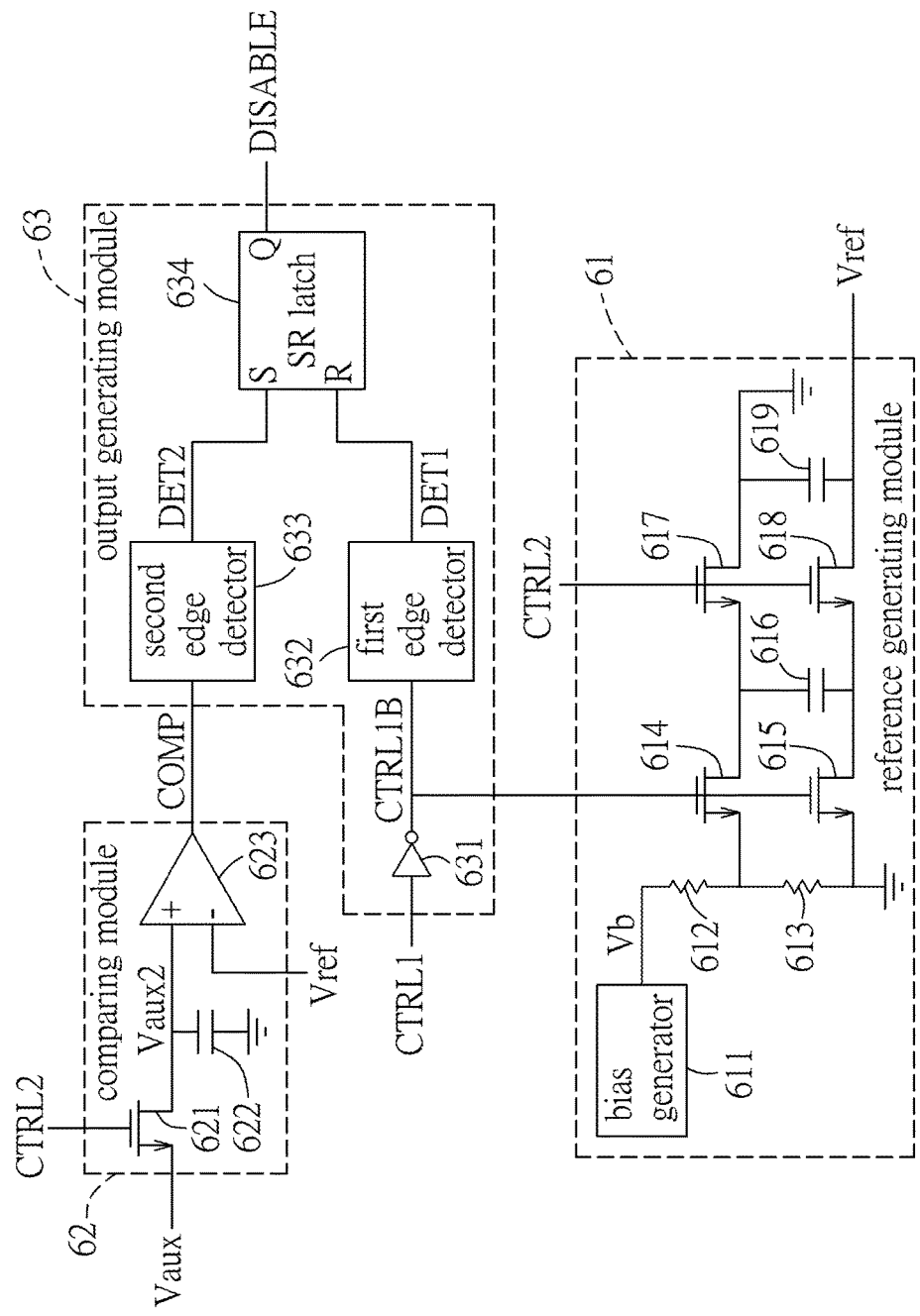
FIG. 2 is a circuit block diagram illustrating a crossing detector of the first embodiment.

Referring to FIGS. 1 and 2, the crossing detector 6 includes a reference generating module 61, a comparing module 62 and an output generating module 63.

The reference generating module 61 generates a reference voltage (Vref) that is negative.

The comparing module 62 is coupled to the second terminal of the first switch 1 for receiving an auxiliary voltage (Vaux) thereat, is coupled further to the controller 5 for receiving the second control signal (CTRL2) therefrom, and is coupled further to the reference generating module 61 for receiving the reference voltage (Vref) therefrom. Based on the second control signal (CTRL2), the comparing module 62 compares the auxiliary voltage (Vaux) during an active time interval of the second control signal (CTRL2) with the reference voltage (Vref) to generate a comparison signal (COMP).

The output generating module 63 is coupled to the controller 5 and the comparing module 62 for receiving the first control signal (CTRL1) and the comparison signal (COMP) respectively therefrom. The output generating module 63 generates, for the controller 5 and based on the first control signal (CTRL1) and the comparison signal (COMP), the disable signal (DISABLE) that is capable of indicating a reference-crossing of the auxiliary voltage (Vaux) which occurs during the active time interval of the second control signal (CTRL2), and at which the auxiliary voltage (Vaux) equals the reference voltage (Vref).

The second control signal (CTRL2) switches into the inactive state upon the disable signal (DISABLE) indicating the reference-crossing of the auxiliary voltage (Vaux).

In this embodiment, the comparing module 62 includes a third switch 621, a second capacitor 622 and a comparator 623. The third switch 621 (e.g., an nMOSFET) has a first terminal (e.g., a source terminal) that is coupled to the second terminal of the first switch 1 for receiving the auxiliary voltage (Vaux) therefrom, a second terminal (e.g., a drain terminal), and a control terminal (e.g., a gate terminal) that is coupled to the controller 5 for receiving the second control signal (CTRL2) therefrom. The third switch 621 conducts when the second control signal (CTRL2) is in the active state, and does not conduct when the second control signal (CTRL2) is in the inactive state. The second capacitor 622 is coupled between the second terminal of the third switch 621 and ground. The third switch 621 and the second capacitor 622 cooperatively make a voltage (Vaux2) at the second terminal of the third switch 621 equal to the auxiliary voltage (Vaux) during the active time interval of the second control signal (CTRL2), and cooperatively make the voltage (Vaux2) unchanged otherwise. The comparator 623 has a first input terminal (e.g., a non-inverting input terminal) that is coupled to the second terminal of the third switch 621 for receiving the voltage (Vaux2) thereat, a second input terminal (e.g., an inverting input terminal) that is coupled to the reference generating module 61 for receiving the reference voltage (Vref) therefrom, and an output terminal that provides the comparison signal (COMP). As shown in FIG. 3, the comparison signal (COMP) switches between a first state (e.g., a logic low level) which corresponds to that the voltage (Vaux2) is lower than the reference voltage (Vref) and a second state (e.g., a logic high level) which corresponds to that the voltage (Vaux2) is higher than the reference voltage (Vref). Switching of the comparison signal (COMP) into the first state is associated with switching of the second control signal (CTRL2) into the active state, and lags the switching of the second control signal (CTRL2) into the active state in time by a time interval of Tp1 due to a finite operation speed of the comparator 623. Switching of the comparison signal (COMP) into the second state is associated with the reference-crossing of the auxiliary voltage (Vaux), and lags the reference-crossing of the auxiliary voltage (Vaux) in time by a time interval of Tp2 due to the finite operation speed of the comparator 623.

In this embodiment, the output generating module 63 includes an inverter 631, a first edge detector 632, a second edge detector 633 and an SR latch 634. The inverter 631 is coupled to the controller 5 for receiving the first control signal (CTRL1) therefrom, and inverts the first control signal (CTRL1) to generate an inverted first control signal (CTRL1B). The first edge detector 632 is coupled to the inverter 631 for receiving the inverted first control signal (CTRL1B) therefrom, and detects, based on the inverted first control signal (CTRL1B), switching of the first control signal (CTRL1) into the active state to generate a first detection signal (DET1). The second edge detector 633 is coupled to the output terminal of the comparator 623 for receiving the comparison signal (COMP) therefrom, and detects the switching of the comparison signal (COMP) into the second state to generate a second detection signal (DET2). The SR latch 634 is coupled to the first and second edge detectors 632, 633 for receiving the first and second detection signals (DET1, DET2) respectively therefrom, and generates the disable signal (DISABLE) based on the first and second detection signals (DET1, DET2). As shown in FIG. 3, the disable signal (DISABLE) switches between a first state (e.g., a logic low level) and a second state (e.g., a logic high level). The SR latch 634 resets the disable signal (DISABLE) to the first state upon the first detection signal (DET1) indicating the switching of the first control signal (CTRL1) into the active state, and sets the disable signal (DISABLE) to the second state upon the second detection signal (DET2) indicating the switching of the comparison signal (COMP) into the second state.

In this embodiment, the reference voltage (Vref) is constant, and is predetermined in a design phase of the switching regulator. As shown in FIG. 3, the reference voltage (Vref) may be set such that the second control signal (CTRL2) switches into the inactive state when the auxiliary voltage (Vaux) is negative or that the second control signal (CTRL2) switches into the inactive state when the auxiliary voltage (Vaux) is zero, and such that a current (IL) flowing through the first inductor 3 is always from one of the first and second switches 1, 2. FIG. 3 depicts a circumstance where the second control signal (CTRL2) switches into the inactive state when the auxiliary voltage (Vaux) is zero. Alternatively, the reference voltage (Vref) may be set such that the second control signal (CTRL2) switches into the inactive state when the auxiliary voltage (Vaux) is positive and relatively small, and such that the current (IL) flowing through the first inductor 3 is from the first capacitor 4 in a relatively short time interval.

In this embodiment, the reference generating module 61 is coupled further to the inverter 631 and the controller 5 for receiving the inverted first control signal (CTRL1B) and the second control signal (CTRL2) respectively therefrom. The reference generating module 61 generates a bias voltage (Vb) that is positive, and converts the bias voltage (Vb) into the reference voltage (Vref) based on the inverted first control signal (CTRL1B) and the second control signal (CTRL2).

In this embodiment, the reference generating module 61 includes a bias generator 611, a first resistor 612, a second resistor 613, a fourth switch 614, a fifth switch 615, a third capacitor 616, a sixth switch 617, a seventh switch 618 and a fourth capacitor 619. The bias generator 611 generates the bias voltage (Vb). The first resistor 612 has a first terminal that is coupled to the bias generator 611 for receiving the bias voltage (Vb) therefrom, and a second terminal. The second resistor 613 is coupled between the second terminal of the first resistor 612 and ground. The fourth switch 614 (e.g., an nMOSFET) has a first terminal (e.g., a source terminal) that is coupled to the second terminal of the first resistor 612, a second terminal (e.g., a drain terminal), and a control terminal (e.g., a gate terminal) that is coupled to the inverter 631 for receiving the inverted first control signal (CTRL1B) therefrom. The fifth switch 615 (e.g., an nMOSFET) has a first terminal (e.g., a source terminal) that is coupled to ground, a second terminal (e.g., a drain terminal), and a control terminal (e.g., a gate terminal) that is coupled to the inverter 631 for receiving the inverted first control signal (CTRL1B) therefrom. The third capacitor 616 is coupled between the second terminals of the fourth and fifth switches 614, 615. The sixth switch 617 (e.g., an nMOSFET) has a first terminal (e.g., a source terminal) that is coupled to the second terminal of the fourth switch 614, a second terminal (e.g., a drain terminal) that is grounded, and a control terminal (e.g., agate terminal) that is coupled to the controller 5 for receiving the second control signal (CTRL2) therefrom. The seventh switch 618 (e.g., an nMOSFET) has a first terminal (e.g., a source terminal) that is coupled to the second terminal of the fifth switch 615, a second terminal (e.g., a drain terminal) that is coupled to the second input terminal of the comparator 623 for providing the reference voltage (Vref) thereto, and a control terminal (e.g., a gate terminal) that is coupled to the controller 5 for receiving the second control signal (CTRL2) therefrom. The fourth capacitor 619 is coupled between ground and the second terminal of the seventh switch 618. Each of the fourth and fifth switches 614, 615 conducts when the first control signal (CTRL1) is in the active state, and does not conduct when the first control signal (CTRL1) is in the inactive state. Each of the sixth and seventh switches 617, 618 conducts when the second control signal (CTRL2) is in the active state, and does not conduct when the second control signal (CTRL2) is in the inactive state. The elements 611-619 cooperatively make the reference voltage (Vref) equal to $-[R2/(R1+R2)]\times Vb$, where R1 and R2 respectively denote resistances of the first and second resistors 612, 613.

It should be noted that, in other embodiments, the following modifications may be made to this embodiment:

1. The third switch 621 and the second capacitor 622 may be omitted. In this case, the first input terminal of the comparator 623 is coupled to the second terminal of the first switch 1 for receiving the auxiliary voltage (Vaux) therefrom, and the comparator 623 compares the auxiliary voltage (Vaux) and the reference voltage (Vref) to generate the comparison signal (COMP).

2. The first edge detector 632 may be omitted. In this case, the SR latch 634 is coupled to the inverter 631 for receiving the inverted first control signal (CTRL1B) therefrom, and resetting the disable signal (DISABLE) to the first state upon the inverted first control signal (CTRL1B) indicating the switching of the first control signal (CTRL1) into the active state.

In view of the above, even if the operation speed of the comparator 623 is relatively slow, the reference voltage (Vref) can be properly determined such that the second control signal (CTRL2) switches into the inactive state when the auxiliary voltage (Vaux) is positive and relatively small, thereby resulting in a relatively small energy loss from the first capacitor 4. Further, the reference voltage (Vref) can be properly determined such that the second control signal (CTRL2) switches into the inactive state when the auxiliary voltage (Vaux) is negative or such that the second control signal (CTRL2) switches into the inactive state when the auxiliary voltage (Vaux) is zero, thereby resulting in no energy loss from the first capacitor 4.

Figure 4:
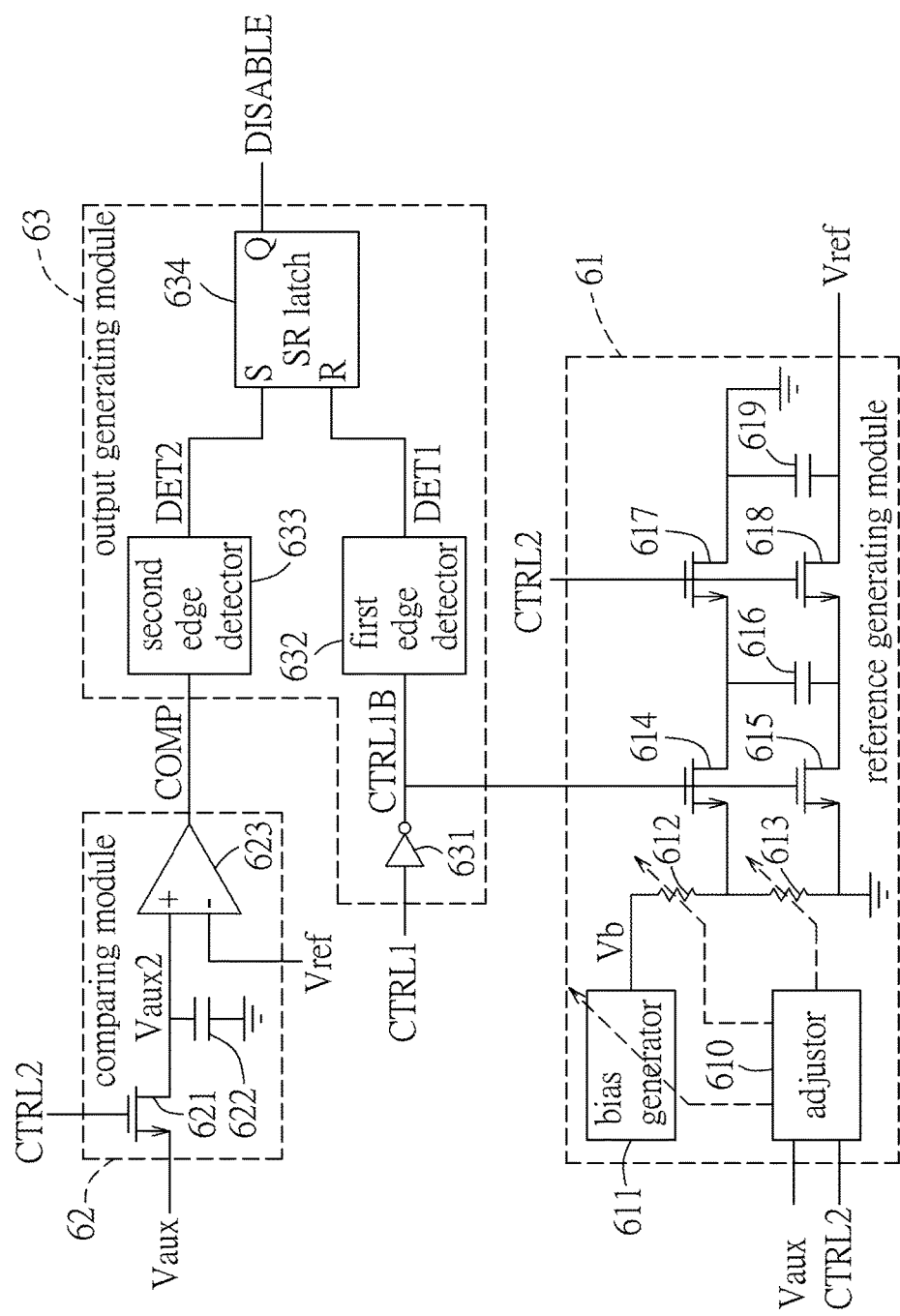
FIG. 4 is a circuit block diagram illustrating a crossing detector of a second embodiment of the switching regulator according to the disclosure.

Referring to FIGS. 1 and 4, a second embodiment of the switching regulator according to the disclosure is a modification of the first embodiment, and differs from the first embodiment in that the reference voltage (Vref) is variable, i.e., not constant.

In the second embodiment, the reference generating module 61 further includes an adjustor 610 that is coupled to the second terminal of the first switch 1 and the controller 5 for receiving the auxiliary voltage (Vaux) and the second control signal (CTRL2) respectively therefrom, and that is coupled further to at least one of the bias generator 611, the first resistor 612 or the second resistor 613. The adjustor 610 adjusts at least one of the bias voltage (Vb), the resistance of the first resistor 612 or the resistance of the second resistor 613 based on the auxiliary voltage (Vaux) and the second control signal (CTRL2), so as to change the reference voltage (Vref), and in such a manner that the second control signal (CTRL2) switches into the inactive state when the auxiliary voltage (Vaux) is zero.

In one example where the adjustor 610 is coupled to the bias generator 611 and not to any of the first and second resistors 612, 613, the adjustor 610 decreases the bias voltage (Vb) (i.e., the reference voltage (Vref) is increased) if the second control signal (CTRL2) switches into the inactive state when the auxiliary voltage (Vaux) is negative, and increases the bias voltage (Vb) (i.e., the reference voltage (Vref) is decreased) if the second control signal (CTRL2) switches into the inactive state when the auxiliary voltage (Vaux) is positive.

In another example where the adjustor 610 is coupled to the first resistor 612 and not to the bias generator 611 or the second resistor 613, the adjustor 610 increases the resistance of the first resistor 612 (i.e., the reference voltage (Vref) is increased) if the second control signal (CTRL2) switches into the inactive state when the auxiliary voltage (Vaux) is negative, and decreases the resistance of the first resistor 612 (i.e., the reference voltage (Vref) is decreased) if the second control signal (CTRL2) switches into the inactive state when the auxiliary voltage (Vaux) is positive.

In yet another example where the adjustor 610 is coupled to the second resistor 613 and not to the bias generator 611 or the first resistor 612, the adjustor 610 decreases the resistance of the second resistor 613 (i.e., the reference voltage (Vref) is increased) if the second control signal (CTRL2) switches into the inactive state when the auxiliary voltage (Vaux) is negative, and increases the resistance of the second resistor 613 (i.e., the reference voltage (Vref) is decreased) if the second control signal (CTRL2) switches into the inactive state when the auxiliary voltage (Vaux) is positive.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A switching regulator comprising:
   a first switch having a first terminal that is used to receive an input voltage, a second terminal, and a control terminal that receives a first control signal;
   a second switch having a first terminal that is coupled to said second terminal of said first switch, a second terminal that is grounded, and a control terminal that receives a second control signal;
   a first inductor having a first terminal that is coupled to said second terminal of said first switch, and a second terminal that is used to provide an output voltage;
   a first capacitor coupled between said second terminal of said first inductor and ground;
   a controller coupled to said control terminals of said first and second switches, receiving a disable signal, and generating the first and second control signals respectively for said first and second switches; and
   a crossing detector including
   a comparing module coupled to said second terminal of said first switch for receiving an auxiliary voltage thereat, further receiving a reference voltage that is negative, and comparing the auxiliary voltage with the reference voltage to generate a comparison signal, and
   an output generating module coupled to said controller and said comparing module for receiving the first control signal and the comparison signal respectively therefrom, and generating, for said controller and based on the first control signal and the comparison signal, the disable signal that is capable of indicating a reference-crossing of the auxiliary voltage at which the auxiliary voltage equals the reference voltage;
   wherein each of the first and second control signals switches between an active state that causes the respective one of said first and second switches to conduct and an inactive state that causes the respective one of said first and second switches to not conduct, and the second control signal switches into the inactive state upon the disable signal indicating the reference-crossing of the auxiliary voltage;
   wherein said crossing detector further includes a reference generating module that is coupled to said comparing module, and that generates the reference voltage for said comparing module;
   wherein said output generating module inverts the first control signal to generate an inverted first control signal;
   wherein said reference generating module is coupled further to said output generating module and said controller for receiving the inverted first control signal and the second control signal respectively therefrom;
   wherein said reference generating module generates a bias voltage that is positive, and converts the bias voltage into the reference voltage based on the inverted first control signal and the second control signal;
   wherein said reference generating module includes
   a bias generator generating the bias voltage,
   a first resistor having a first terminal that is coupled to said bias generator for receiving the bias voltage therefrom, and a second terminal,
   a second resistor coupled between said second terminal of said first resistor and ground,
   a third switch having a first terminal that is coupled to said second terminal of said first resistor, a second terminal, and a control terminal that is coupled to said output generating module for receiving the inverted first control signal therefrom,
   a fourth switch having a first terminal that is coupled to ground, a second terminal, and a control terminal that is coupled to said output generating module for receiving the inverted first control signal therefrom,
   a second capacitor coupled between said second terminals of said third and fourth switches,
   a fifth switch having a first terminal that is coupled to said second terminal of said third switch, a second terminal that is grounded, and a control terminal that is coupled to said controller for receiving the second control signal therefrom,
   a sixth switch having a first terminal that is coupled to said second terminal of the fourth switch, a second terminal that is coupled to said comparing module for providing the reference voltage thereto, and a control terminal that is coupled to said controller for receiving the second control signal therefrom, and a third capacitor coupled between ground and said second terminal of said sixth switch.

2. The switching regulator of claim 1, wherein the reference voltage is sufficient such that the second control signal switches into the inactive state when the auxiliary voltage is negative or such that the second control signal switches into the inactive state when the auxiliary voltage is zero.

3. The switching regulator of claim 1, wherein the reference voltage is constant.

4. The switching regulator of claim 1, wherein:

each of said third and fourth switches conducts when the first control signal is in the active state, and does not conduct when the first control signal is in the inactive state; and each of said fifth and sixth switches conducts when the second control signal is in the active state, and does not conduct when the second control signal is in the inactive state.

5. The switching regulator of claim 1, wherein said reference generating module further includes an adjustor that is coupled to said second terminal of said first switch and said controller for receiving the auxiliary voltage and the second control signal respectively therefrom, and that is coupled further to at least one of said bias generator, said first resistor or said second resistor, said adjustor adjusting at least one of the bias voltage, a resistance of said first resistor or a resistance of said second resistor based on the auxiliary voltage and the second control signal in such a manner that the second control signal switches into the inactive state when the auxiliary voltage is zero.

6. The switching regulator of claim 1, wherein:

said comparing module is coupled further to said controller for receiving the second control signal therefrom; and based on the second control signal, said comparing module compares the auxiliary voltage during an active time interval of the second control signal with the reference voltage to generate the comparison signal.

7. The switching regulator of claim 6, wherein said comparing module includes:

a seventh switch having a first terminal that is coupled to said second terminal of said first switch for receiving the auxiliary voltage therefrom, a second terminal, and a control terminal that is coupled to said controller for receiving the second control signal therefrom, said seventh switch conducting when the second control signal is in the active state, and not conducting when the second control signal is in the inactive state;

a fourth capacitor coupled between said second terminal of said seventh switch and ground; and a comparator having a first input terminal that is coupled to said second terminal of said seventh switch, a second input terminal that receives the reference voltage, and an output terminal that is coupled to said output generating module for providing the comparison signal thereto.

8. The switching regulator of claim 1, wherein:

the comparison signal switches between a first state and a second state, and switching thereof into the second state is associated with the reference-crossing of the auxiliary voltage; and the disable signal switches between a first state and a second state, switching thereof into the first state is associated with switching of the first control signal into the active state, and switching thereof into the second state is associated with the switching of the comparison signal into the second state.

9. The switching regulator of claim 8, wherein the output generating module includes:

an inverter coupled to said controller for receiving the first control signal therefrom, and inverting the first control signal to generate the inverted first control signal;

a first edge detector coupled to said inverter for receiving the inverted first control signal therefrom, and detecting, based on the inverted first control signal, the switching of the first control signal into the active state to generate a first detection signal; and a second edge detector coupled to said comparing module for receiving the comparison signal therefrom, and detecting the switching of the comparison signal into the second state to generate a second detection signal;

an SR latch coupled to said first and second edge detectors for receiving the first and second detection signals respectively therefrom, coupled further to said controller, and generating the disable signal for said controller based on the first and second detection signals, said SR latch resetting the disable signal to the first state upon the first detection signal indicating the switching of the first control signal into the active state, and setting the disable signal to the second state upon the second detection signal indicating the switching of the comparison signal into the second state.

* * * * *